US012643611B1

(12) United States Patent
Dai

(10) Patent No.: US 12,643,611 B1
(45) Date of Patent: Jun. 2, 2026

(54) PURE ELECTRIC VEHICLE AND LIFTING CHASSIS STRUCTURE THEREOF

(71) Applicant: Xiamen Dalle New Energy Automobile Co., Ltd., Xiamen (CN)

(72) Inventor: Side Dai, Xiamen (CN)

(73) Assignee: Xiamen Dalle New Energy Automobile Co., Ltd., Xiamen (CN)

( * ) Notice: Subject to any disclaimer, the term of this patent is extended or adjusted under 35 U.S.C. 154(b) by 0 days.

(21) Appl. No.: 19/317,383

(22) Filed: Sep. 3, 2025

(30) Foreign Application Priority Data

Apr. 29, 2025 (CN) .......................... 202520842127.1

(51) Int. Cl.
*B62D 24/04* (2006.01)
*B60G 99/00* (2010.01)

(52) U.S. Cl.
CPC ........... *B62D 24/04* (2013.01); *B60G 99/002* (2013.01); *B60G 2202/422* (2013.01); *B60Y 2200/143* (2013.01); *B60Y 2200/86* (2013.01); *B60Y 2200/91* (2013.01)

(58) Field of Classification Search
CPC .................. B62D 24/04; B60G 99/002; B60G 2202/422; B60G 7/04; B60G 2204/4502; B60Y 2200/143; B60Y 2200/86; B60Y 2200/91
See application file for complete search history.

(56) References Cited

U.S. PATENT DOCUMENTS

| | | | | | |
|---|---|---|---|---|---|
| 3,115,349 | A | * | 12/1963 | Lerg ..................... | B60G 15/062 |
| | | | | | 267/222 |
| 4,690,428 | A | * | 9/1987 | Fluegge ................. | B60G 11/16 |
| | | | | | 280/124.141 |
| 4,960,290 | A | * | 10/1990 | Bose ...................... | B60G 13/18 |
| | | | | | 267/221 |
| 4,981,309 | A | * | 1/1991 | Froeschle ........ | B60G 17/01933 |
| | | | | | 280/5.514 |
| 5,009,451 | A | * | 4/1991 | Hayashi ............. | B60G 17/0272 |
| | | | | | 267/221 |
| 5,310,200 | A | * | 5/1994 | MacIsaac ............. | B60G 99/002 |
| | | | | | 280/5.506 |
| 5,356,162 | A | * | 10/1994 | Derrien .................. | B62D 61/12 |
| | | | | | 280/43.23 |
| 5,593,175 | A | * | 1/1997 | Oda ..................... | B60G 17/005 |
| | | | | | 180/209 |

(Continued)

*Primary Examiner* — Timothy Wilhelm
(74) *Attorney, Agent, or Firm* — COOPER LEGAL GROUP LLC

(57) ABSTRACT

A lifting chassis structure for a pure electric vehicle includes a chassis body, a movable front suspension, a movable rear suspension, two front lifting devices, and one or more rear lifting devices. A front subframe and a rear subframe are configured to be respectively driven by the two front lifting devices and the one or more rear lifting devices, so as to be lifted up and down respectively relative to the movable front suspension and the movable rear suspension. The movable front suspension includes two shock absorber assemblies connected to a steering assembly. The two front lifting devices are arranged in a splayed pattern. The two front lifting devices respectively correspond to the two shock absorber assemblies, and each of the two front lifting devices is parallel to an adjacent one of the two shock absorber assemblies.

16 Claims, 8 Drawing Sheets

(56)     References Cited

U.S. PATENT DOCUMENTS

| | | | | |
|---|---|---|---|---|
| 6,000,702 A * | 12/1999 | Streiter | B60G 17/016 | 280/5.514 |
| 6,036,201 A * | 3/2000 | Pond | B60G 15/12 | 280/5.514 |
| 6,708,094 B2 * | 3/2004 | Charaudeau | B60G 17/0157 | 701/37 |
| 6,811,454 B2 * | 11/2004 | Royle | B60G 3/18 | 440/12.5 |
| 6,908,108 B1 * | 6/2005 | Scarla | A63H 17/262 | 280/756 |
| 7,273,117 B2 * | 9/2007 | Pond | B60G 15/12 | 280/124.128 |
| 7,513,516 B2 * | 4/2009 | Ryan | B60G 15/067 | 248/183.3 |
| 7,654,540 B2 * | 2/2010 | Parison | H02K 41/02 | 310/12.32 |
| 7,810,818 B2 * | 10/2010 | Bushko | B60G 3/01 | 280/5.507 |
| 7,819,220 B2 * | 10/2010 | Sunsdahl | B60N 2/01 | 180/312 |
| 7,828,098 B2 * | 11/2010 | Yamamoto | B60R 16/04 | 180/908 |
| 7,934,725 B2 * | 5/2011 | Brehob | B62D 61/12 | 280/5.514 |
| 7,950,675 B1 * | 5/2011 | Quenzi | B60P 1/027 | 180/209 |
| 7,963,529 B2 * | 6/2011 | Oteman | H02K 16/00 | 74/89.3 |
| 8,079,602 B2 * | 12/2011 | Kinsman | B62D 21/14 | 280/5.512 |
| 8,191,874 B2 * | 6/2012 | Inoue | B60G 15/02 | 188/267 |
| 8,376,373 B2 * | 2/2013 | Conradie | B60G 3/145 | 280/5.514 |
| 8,397,737 B2 * | 3/2013 | Evans | F16H 25/20 | 135/65 |
| 8,457,841 B2 * | 6/2013 | Knoll | B60G 17/08 | 701/37 |
| 8,614,518 B2 * | 12/2013 | Li | F03G 7/081 | 290/1 R |
| 8,833,780 B2 * | 9/2014 | Cheng | F16F 15/03 | 280/124.179 |
| 9,102,389 B2 * | 8/2015 | King | B63C 13/00 | |
| 9,499,024 B2 * | 11/2016 | Mori | B62K 5/05 | |
| 9,844,992 B2 * | 12/2017 | Aldrich | B62D 7/20 | |
| 10,160,497 B2 * | 12/2018 | Wimpfheimer | B60G 3/20 | |
| 10,427,483 B1 * | 10/2019 | Aldrich | B60G 9/00 | |
| 10,493,798 B2 * | 12/2019 | Moen | B60B 19/14 | |
| 10,611,204 B1 * | 4/2020 | Zhang | B60G 17/016 | |
| 11,104,194 B2 * | 8/2021 | Schlangen | B60G 3/20 | |
| 11,130,382 B2 * | 9/2021 | Nong | B60G 17/06 | |
| 11,352,055 B2 * | 6/2022 | De Grammont | B60K 17/20 | |
| 11,358,431 B2 * | 6/2022 | Hall | B60G 17/0155 | |
| 11,358,634 B2 * | 6/2022 | Mainville | B60G 3/20 | |
| 11,524,541 B2 * | 12/2022 | Corsico | B60G 17/018 | |
| 11,712,964 B1 * | 8/2023 | Drach | B60K 7/0007 | 180/245 |
| 12,233,677 B2 * | 2/2025 | Corsico | B60G 17/015 | |
| 12,351,248 B2 * | 7/2025 | Prashant Rao | B62D 49/0678 | |
| 2005/0257972 A1 * | 11/2005 | Iwami | B62K 5/027 | 180/68.1 |
| 2006/0065454 A1 * | 3/2006 | Oshima | B62K 5/01 | 180/312 |
| 2007/0125611 A1 * | 6/2007 | Zara | B60G 15/068 | 188/297 |
| 2008/0093818 A1 * | 4/2008 | Nykanen | F16F 9/46 | 280/124.16 |
| 2011/0272900 A1 * | 11/2011 | Lares | B60G 9/02 | 280/5.513 |
| 2011/0298189 A1 * | 12/2011 | Schneider | B62D 23/005 | 296/64 |
| 2012/0255799 A1 * | 10/2012 | Kohler | B60L 58/20 | 180/65.245 |
| 2015/0047917 A1 * | 2/2015 | Burt, II | B62D 25/2036 | 180/68.5 |
| 2019/0359025 A1 * | 11/2019 | Wager | B60G 21/005 | |
| 2022/0119235 A1 * | 4/2022 | Christensen | B66F 7/22 | |
| 2023/0249509 A1 * | 8/2023 | Matthews | B60G 3/14 | 180/204 |
| 2023/0302865 A1 * | 9/2023 | Tong | B60G 17/056 | |
| 2024/0270333 A1 * | 8/2024 | Tippett | B62D 57/028 | |

* cited by examiner

PURE ELECTRIC VEHICLE AND LIFTING CHASSIS STRUCTURE THEREOF

RELATED APPLICATIONS

This application claims priority to Chinese patent application number 202520842127.1, filed on Apr. 29, 2025. Chinese patent application number 202520842127.1 is incorporated herein by reference.

FIELD OF THE DISCLOSURE

The present disclosure relates to electric vehicle equipment, in particular to a lifting chassis structure of a pure electric vehicle and the small pure electric vehicle.

BACKGROUND OF THE DISCLOSURE

In traditional small pure electric vehicle chassis design, the chassis height is fixed, making it difficult to adapt to complex road conditions. For example, when driving on uneven roads, a higher chassis improves ground clearance but increases aerodynamic drag and energy consumption. Conversely, at high speeds, a lower chassis reduces aerodynamic drag but increases the risk of scraping chassis components.

With the rapid development of electric vehicle technology, the structural design of small pure electric vehicle chassis is also continuously evolving. To meet driving demands under different road conditions and enhance vehicle passability, handling, and comfort, adjustable chassis height technology has gradually become a research focus.

BRIEF SUMMARY OF THE DISCLOSURE

The technical problem to be solved by the present disclosure is to provide a lifting chassis structure for a pure electric vehicle, which meets a requirement that a chassis of the small pure electric vehicle can be lifted up or down.

In order to solve the above technical problems, the present disclosure provides a lifting chassis structure for a pure electric vehicle, and the lifting chassis structure comprises a chassis body, a movable front suspension, a movable rear suspension, two front lifting devices, and one or more rear lifting devices.

The chassis body comprises a front subframe and a rear subframe, and the two front lifting devices are respectively connected to the movable front suspension and the front subframe. The one or more rear lifting devices are respectively connected to the movable rear suspension and the rear subframe.

The front subframe and the rear subframe are configured to be respectively driven by the two front lifting devices and the one or more rear lifting devices, so as to be lifted up and down respectively relative to the movable front suspension and the movable rear suspension, so that the chassis body is lifted up and down in a height direction.

The movable front suspension comprises two shock absorber assemblies and a steering assembly, and the two shock absorber assemblies are connected to the steering assembly. The two front lifting devices are arranged in a splayed pattern.

The two front lifting devices respectively correspond to the two shock absorber assemblies, and each of the two front lifting devices is parallel to an adjacent one of the two shock absorber assemblies.

In a preferred embodiment, the front subframe comprises a space for placing the movable front suspension, and the movable front suspension comprises a first mounting frame configured to be connected to the steering assembly and a second mounting frame configured to be connected to the two front lifting devices. The first mounting frame is connected to the second mounting frame.

The front subframe comprises an impact protection assembly, and when the front subframe is lifted up or down, the impact protection assembly cooperates with the first mounting frame.

In a preferred embodiment, the impact protection assembly comprises an upper bumper and a lower bumper, which are spaced apart in the height direction.

When the front subframe is lifted up to a highest position, the lower bumper contacts a bottom of the first mounting frame.

When the front subframe is lifted down to a lowest position, the upper bumper contacts a top of the first mounting frame.

In a preferred embodiment, the upper bumper and the lower bumper are rubber pads.

In a preferred embodiment, each of the two front lifting devices comprises a front electric push rod, and the front subframe comprises an upper mounting seat. The second mounting frame comprises a lower mounting seat and a shock absorber mounting seat.

Two ends of the front electric push rod are respectively pivotally connected to the upper mounting seat and the lower mounting seat, and one end of the front electric push rod that is pivotally connected to the upper mounting seat is a lifting end. Two ends of each of the two shock absorber assemblies are respectively pivotally connected to the shock absorber mounting seat and the steering assembly, and the shock absorber mounting seat is arranged adjacent to the upper mounting seat in the height direction.

In a preferred embodiment, the movable rear suspension comprises two shock absorbers, and the two shock absorbers are respectively connected to a motor drive mechanism connected to two rear wheels.

The one or more rear lifting devices are two rear lifting devices, and the two rear lifting devices respectively correspond to the two shock absorbers.

In a preferred embodiment, the movable rear suspension comprises a lower mounting transverse rod, and the rear subframe comprises an upper mounting transverse rod. Each of the one or more rear lifting devices comprises a rear electric push rod.

Two ends of the rear electric push rod are respectively pivotally connected to the upper mounting transverse rod and the lower mounting transverse rod, and one end of the rear electric push rod that is pivotally connected to the upper mounting transverse rod is a lifting end.

In a preferred embodiment, the rear subframe covers an upper portion of the movable rear suspension, and two sides of the rear subframe are disposed with two first supporting rods in a width direction of the rear subframe. Two sides of the movable rear suspension are disposed with two second supporting rods in the width direction of the rear subframe.

The two first supporting rods are disposed above the two second supporting rods, and a rubber impact protection pad is disposed on an upper surface of the two second supporting rods. When the rear subframe is lifted down to a lowest position, the rubber impact protection pad contacts the first supporting rod.

In a preferred embodiment, the rear subframe comprises a storage rack, and the storage rack is disposed between the two second supporting rods on the two sides of the movable rear suspension in the width direction of the rear subframe.

A nylon pad is disposed on a side of each of the two second supporting rods facing the storage rack, and two sides of the storage rack are disposed with two third supporting rods in the width direction of the rear subframe. The nylon pad frictionally cooperates with the two third supporting rods.

The present disclosure provides a pure electric vehicle, and the pure electric vehicle comprises the lifting chassis structure. The pure electric vehicle is a golf cart, a sightseeing tour bus, a shared electric vehicle, or a passenger electric vehicle.

Compared with the existing techniques, the technical solution has the following advantages.

1. The two front lifting devices and the one or more rear lifting devices are arranged at positions corresponding to the movable front suspension and the movable rear suspension of the chassis body. A lifting function is achieved through the two front lifting devices and the one or more rear lifting devices, thereby realizing flexible adjustment of a chassis height, and at the same time improving the passability, controllability, and comfort of the vehicle.

2. Through independent control of the two front lifting devices and the one or more rear lifting devices, the chassis height can be flexibly adjusted, improving the passability and controllability of the vehicle under different road conditions.

3. The two front lifting devices serve as a power source for raising and lowering the movable front suspension. The two front lifting devices are distributed in a splayed pattern to achieve better stability of the movable front suspension in an up and down direction and a left and right direction.

4. The two shock absorber assemblies are arranged in parallel with the two front lifting devices, so that the two front lifting devices and the two shock absorber assemblies cooperate with each other in space, ensuring that the two front lifting device and the two shock absorber assemblies are subjected to more uniform force during operation and avoiding system instability caused by inconsistent force direction.

5. The two shock absorber assemblies are parallel to the two front lifting devices. This arrangement effectively reduces an impact of lateral forces on the two front lifting devices and the two shock absorber assemblies during driving, improving system stability and reliability. Furthermore, the two shock absorber assemblies are parallel to the two front lifting devices, allowing the two shock absorber assemblies and the two front lifting devices to work together during driving to better absorb and cushion road shock and vibration, optimizing shock absorption and enhancing vehicle comfort.

EXPLANATION OF THE ACCOMPANYING SYMBOLS

Figure 1:
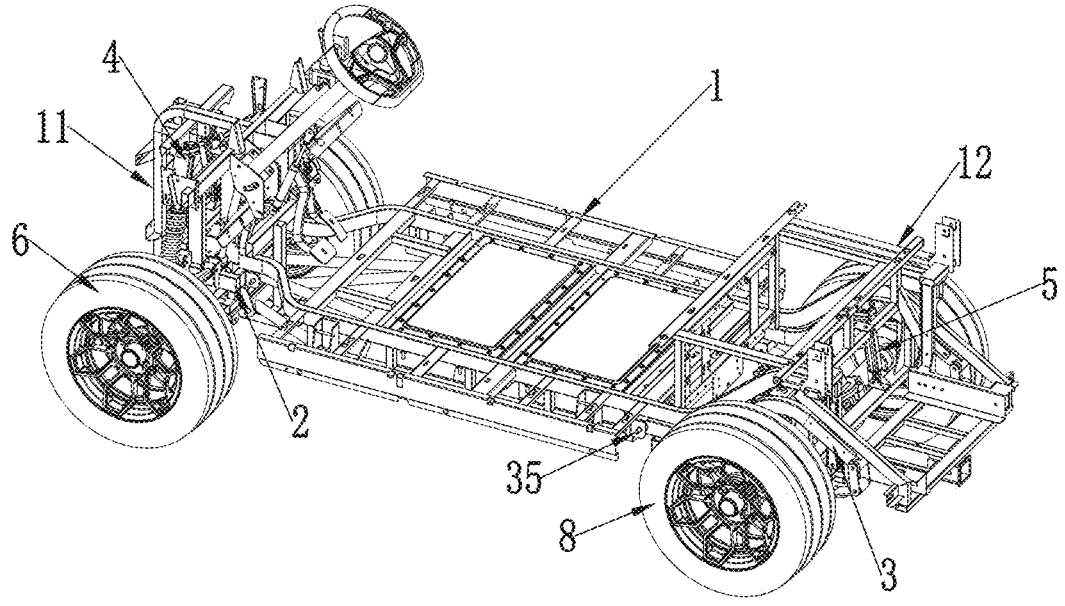
FIG. 1 is an overall schematic diagram of a lifting chassis structure of a small pure electric vehicle in a preferred embodiment of the present disclosure.

1. chassis body; 11. front subframe; 111. upper bumper; 112. lower bumper; 113. upper mounting seat; 12. rear subframe; 121. upper mounting transverse rod; 122. first supporting rod; 123. storage rack; 124. third supporting rod; 13. intermediate supporting frame; 2. movable front suspension; 21. shock absorber assembly; 22. first mounting frame; 23. second mounting frame; 231. lower mounting seat; 232. shock absorber mounting seat; 24. supporting connecting rod; 3. movable rear suspension; 31. shock absorber; 32. lower mounting transverse rod; 33. second supporting rod; 34. rubber impact protection pad; 35. pivoting shaft; 36. nylon pad; 4. front lifting device; 41. front electric push rod; 5. rear lifting device; 51. rear electric push rod; 6. front wheel; 7. steering assembly; steering wheel assembly 70; 71. steering gear; 721. upper control arms; 722. lower control arms; 73. universal joint; 8. rear wheel; 9. motor drive mechanism; 91. DC motor; 92. rear axle.

DETAILED DESCRIPTION OF THE EMBODIMENTS

The technical solutions in the embodiments of the present disclosure will be clearly and completely described below in conjunction with the drawings in the embodiments of the present disclosure. It is obvious that the described embodiments are only part of the embodiments of the present disclosure, rather than all the embodiments. Based on the embodiments of the present disclosure, all other embodiments obtained by ordinary technicians in this field without making creative work are within the scope of protection of the present disclosure.

In the description of this disclosure, it should be noted that the terms "upper," "lower," "inner," "outer," "top," "bottom," and the like, indicating orientations or positional relationships, are based on the orientations or positional relationships shown in the accompanying drawings and are intended solely to facilitate the description of this disclosure and simplify the description. They are not intended to indicate or imply that the devices or components referred to must have a specific orientation, be constructed, or operate in a specific orientation. Therefore, they should not be construed as limitations on this disclosure. Furthermore, the terms "first" and "second" are used for descriptive purposes only and should not be construed as indicating or implying relative importance.

In the description of the present disclosure, it should be noted that, unless otherwise clearly specified and limited, the terms "installed", "provided with", "sleeved on", "connected", etc. should be understood in a broad sense. For example, "connection" can be a wall-mounted connection, a detachable connection, or an integral connection. It can be a mechanical connection or an electrical connection. It can be a direct connection or an indirect connection through an intermediate medium. It can be the internal connection of two components. For ordinary technicians in this field, the specific meanings of the above terms in the present disclosure can be understood according to specific circumstances.

Referring to FIGS. 1 to 6, this embodiment provides a lifting chassis structure for a small pure electric vehicle. The lifting chassis structure is suitable for a variety of small pure electric vehicles, such as golf carts, sightseeing tour buses, shared electric vehicles, and passenger electric vehicles. The lifting chassis structure has wide applicability and market prospects, and the lifting chassis structure can significantly improve the performance of the vehicle and user experience.

Figure 2:
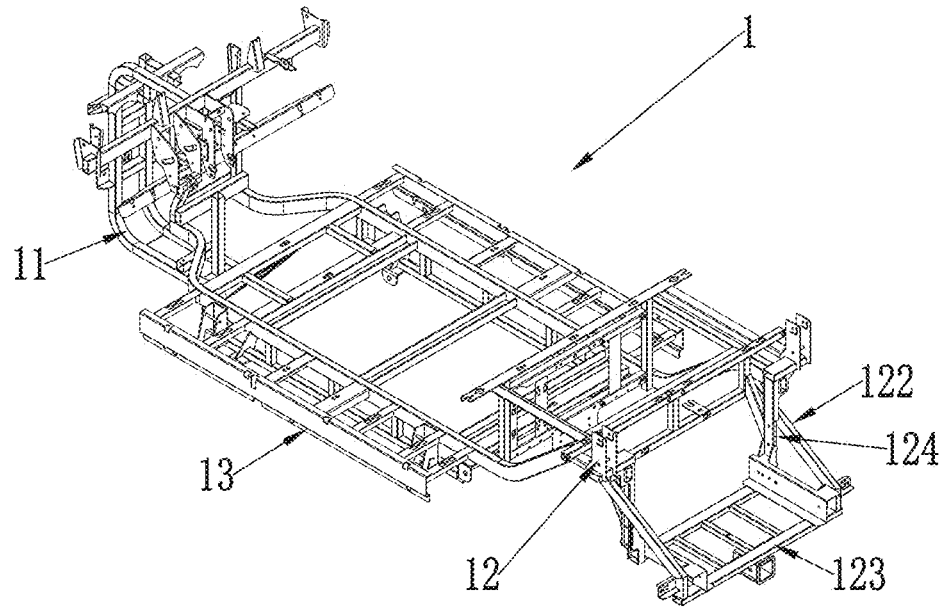
FIG. 2 is an overall schematic diagram of a chassis body in the lifting chassis structure in the preferred embodiment of the present disclosure.

The small pure electric vehicle is a four-wheel electric vehicle driven by an independent hub motor. As shown in FIG. 1, the lifting chassis structure of the small pure electric vehicle comprises a chassis body 1, a movable front suspension 2, a movable rear suspension 3, two front lifting devices 4, and one or more rear lifting devices 5. As shown in FIG. 2, the chassis body 1 comprises a front subframe 11 and a rear subframe 12. The two front lifting devices 4 are respectively connected to the movable front suspension 2 and the front subframe 11, and the one or more rear lifting devices 5 are respectively connected to the movable rear suspension 3 and the rear subframe 12. The front subframe 11 and the rear subframe 12 can be respectively driven by the two front lifting devices 4 and the one or more rear lifting devices 5, so as to be lifted up and down respectively relative to the movable front suspension 2 and the movable rear suspension 3, so that the chassis body 1 is lifted up and down in a height direction. Through independent control of the two front lifting devices 4 and the one or more rear lifting devices 5, a height of the chassis body 1 can be flexibly adjusted, thereby improving passability and controllability of the small pure electric vehicle under different road conditions.

Figure 3:
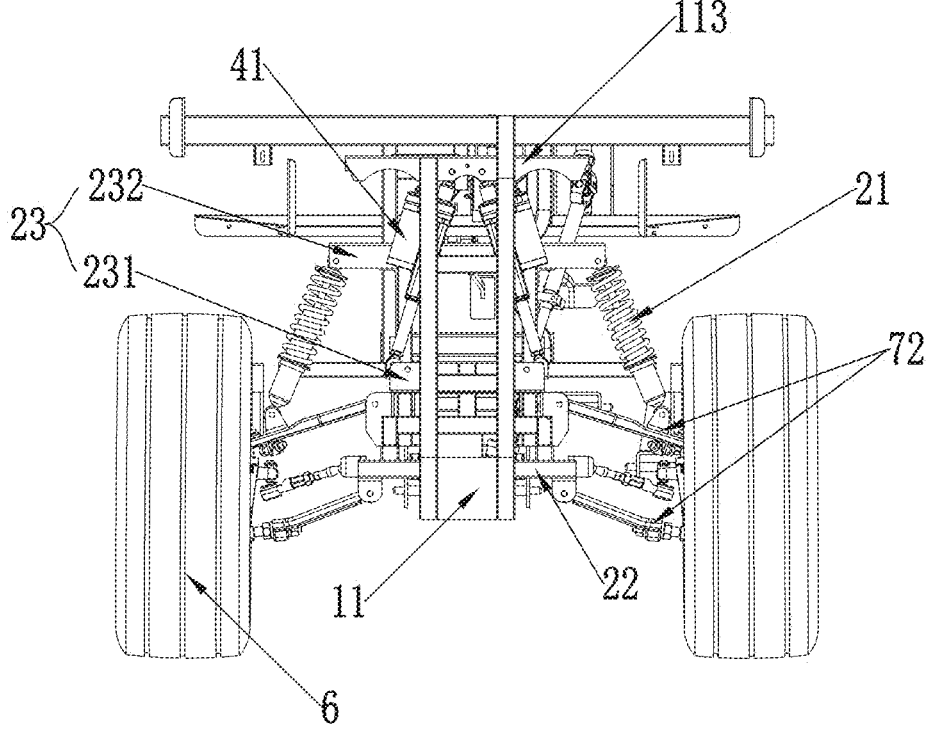
FIG. 3 is an assembly schematic diagram of a front subframe, a movable front suspension, and one or more front lifting devices in the preferred embodiment of the present disclosure.
Figure 7:
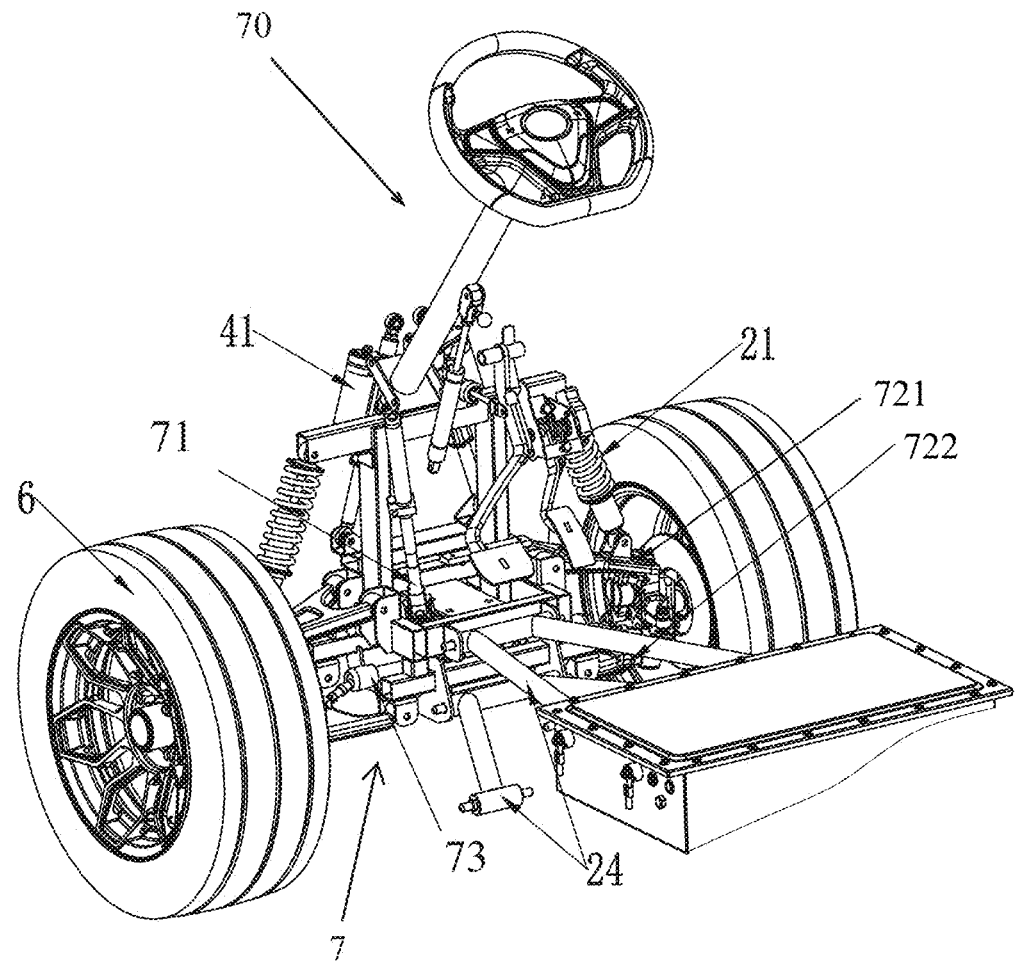
FIG. 7 is an assembly schematic diagram of the movable front suspension and a steering assembly in the preferred embodiment of the present disclosure.

As shown in FIG. 1 and FIG. 7, the chassis body 1 further comprises an intermediate supporting frame 13 connected to the front subframe 11 and the rear subframe 12. The movable front suspension 2 is pivotally connected to the intermediate supporting frame 13 through four supporting connecting rods 24. During a vehicle driving process, the four supporting connecting rods 24 serve as upper and lower stabilizers to ensure a normal vehicle driving process. The movable rear suspension 3 is pivotally connected to the intermediate supporting frame 13 through two pivot shafts 35. As shown in FIG. 3, the movable front suspension 2 comprises two shock absorber assemblies 21, and each of the two shock absorber assemblies 21 is connected to a steering assembly 7 connected to two front wheels 6. The two front lifting devices 4 respectively correspond to the two shock absorber assemblies 21. Each of the two front lifting devices 4 is parallel to an adjacent one of the two shock absorber assemblies 21, ensuring that the two front lifting devices 4 and the two shock absorber assemblies 21 are subjected to more uniform force during operation, optimizing a shock absorption effect and enhancing vehicle comfort.

As shown in FIG. 7, the movable front suspension 2 is connected to the two front wheels 6 through the steering assembly 7. The movable front suspension 2 comprises the steering assembly 7, and the steering assembly 7 comprises a steering gear 71, two upper control arms 721, two lower control arms 722, and two universal joints 73. The two universal joints 73 are connected to a steering wheel assembly 70, and the steering gear 71 is used to control steering of the two front wheels 6. The two shock absorber assemblies 21 are connected to the two upper control arms 721. During vehicle operation, the two universal joints 73 are lifted up and down with the small pure electric vehicle, and the two shock absorber assemblies 21 are lifted up and down synchronously with the steering gear 71, the two upper control arms 721, and the two lower control arms 722. During a raising and lowering process of the small pure electric vehicle, a normal driving performance is maintained without tire displacement, avoiding drawbacks of traditional lifting chassis such as uneven tire wear and instability during travel.

As shown in FIG. 3, the front subframe 11 comprises a space for placing the movable front suspension 2. The movable front suspension 2 comprises a first mounting frame 22 configured to be connected to the steering assembly 7 and a second mounting frame 23 configured to be connected to the two front lifting devices 4. The front subframe 11 further comprises an impact protection assembly. When the front subframe 11 is lifted up or down, the impact protection assembly cooperates with the first mounting frame 22, effectively protecting the front subframe 11 from collision damage during the raising or lowering process, thereby improving safety and durability of the small pure electric vehicle.

Figure 5:
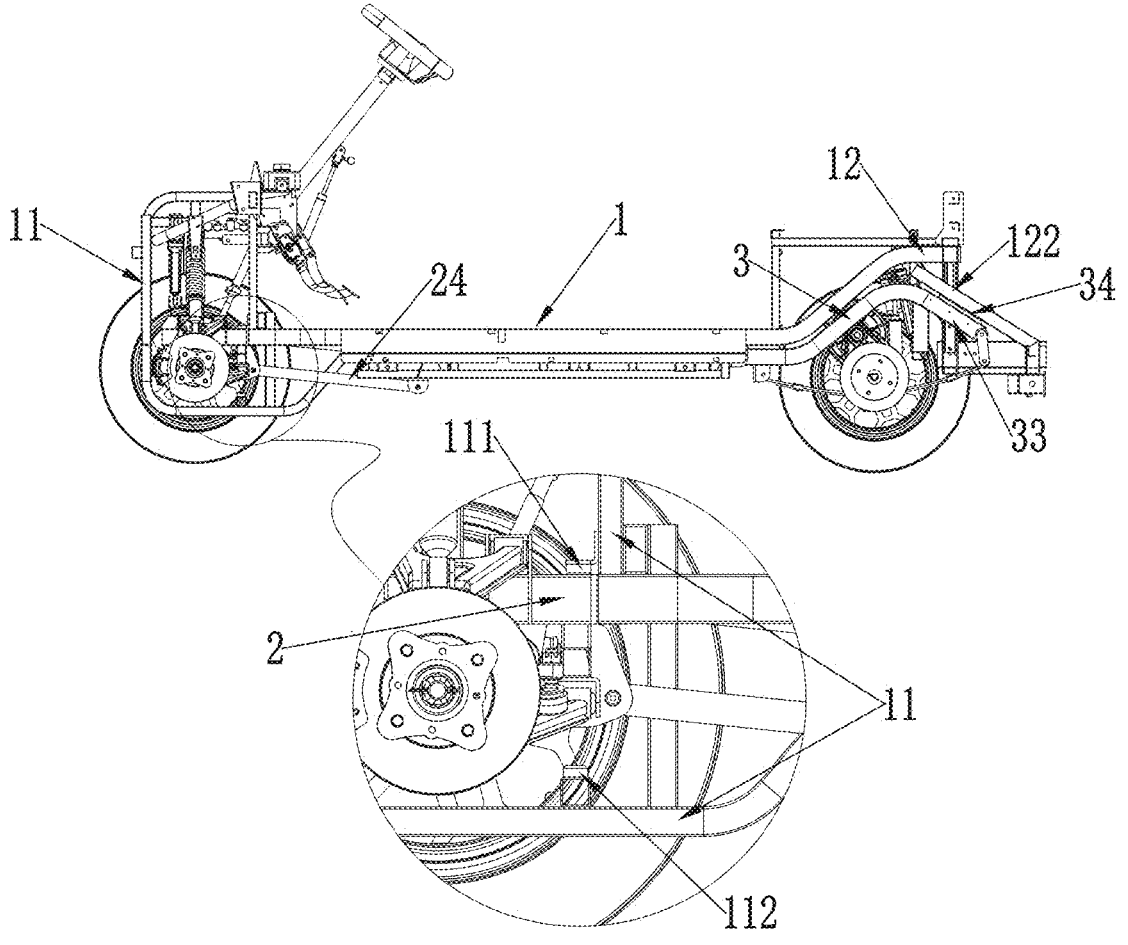
FIG. 5 is a schematic diagram of the front subframe being lifted down in height in the lifting chassis structure in the preferred embodiment of the present disclosure.
Figure 6:
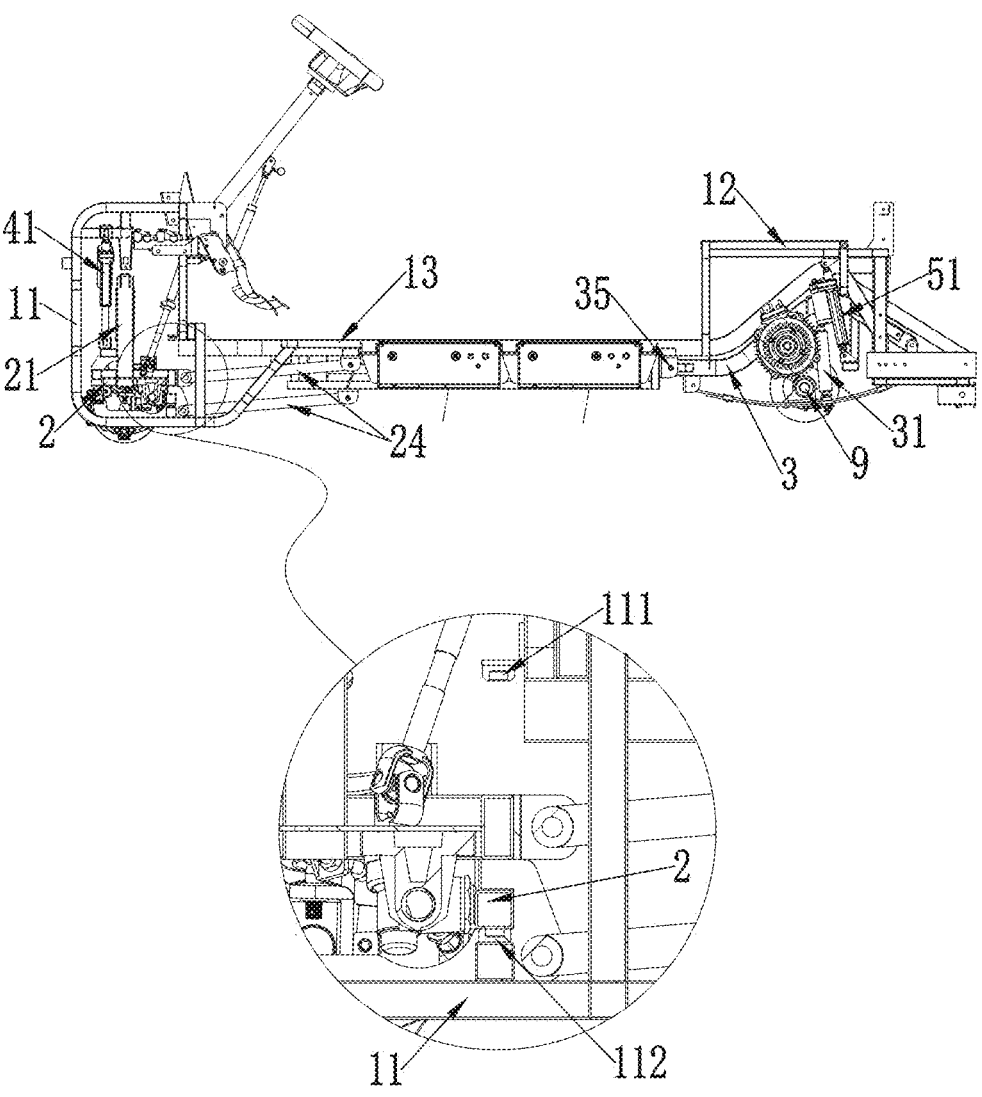
FIG. 6 is a schematic diagram of the front subframe being lifted up in height in the lifting chassis structure in the preferred embodiment of the present disclosure.

As shown in FIG. 5, the impact protection assembly comprises an upper bumper 111 and a lower bumper 112, which are spaced apart in the height direction. When the front subframe 11 is lifted up to a highest position, the lower bumper 112 contacts a bottom of the first mounting frame 22 (as shown in FIG. 6). When the front subframe 11 is lifted down to a lowest position, the upper bumper 111 contacts a top of the first mounting frame 22 (as shown in FIG. 5). The upper bumper 111 and the lower bumper 112 ensure that the front subframe 11 is properly positioned and cushioned during the raising and lowering process, further enhancing stability and safety of the small pure electric vehicle.

Specifically, the upper bumper 111 and the lower bumper 112 are rubber pads. The rubber pads have good elasticity and wear resistance, can effectively absorb collision energy, protect vehicle components, and extend service life of the vehicle components.

As shown in FIG. 3, the two front lifting devices 4 are assembled as follows. Each of the two front lifting devices 4 comprises a front electric push rod 41. The front subframe 11 comprises an upper mounting seat 113, and the second mounting frame 23 comprises a lower mounting seat 231 and a shock absorber mounting seat 232. Two ends of the front electric push rod 41 are respectively pivotally connected to the upper mounting seat 113 and the lower mounting seat 231. Two ends of each of the two shock absorber assemblies 21 are respectively pivotally connected to the shock absorber mounting seat 232 and the steering assembly 7. One end of the front electric push rod 41 that is pivotally connected to the upper mounting seat 113 is a lifting end, and the shock absorber mounting seat 232 is arranged adjacent to the upper mounting seat 113 in the height direction. The shock absorber mounting seat 232 is arranged adjacent to the upper mounting seat 113 to optimize an installation position of the two shock absorber assemblies 21. The front electric push rod 41 and the two shock absorber assemblies 21 can work together during vehicle driving to improve vibration reduction effect and reduce vibration and impact during vehicle driving.

Figure 4:
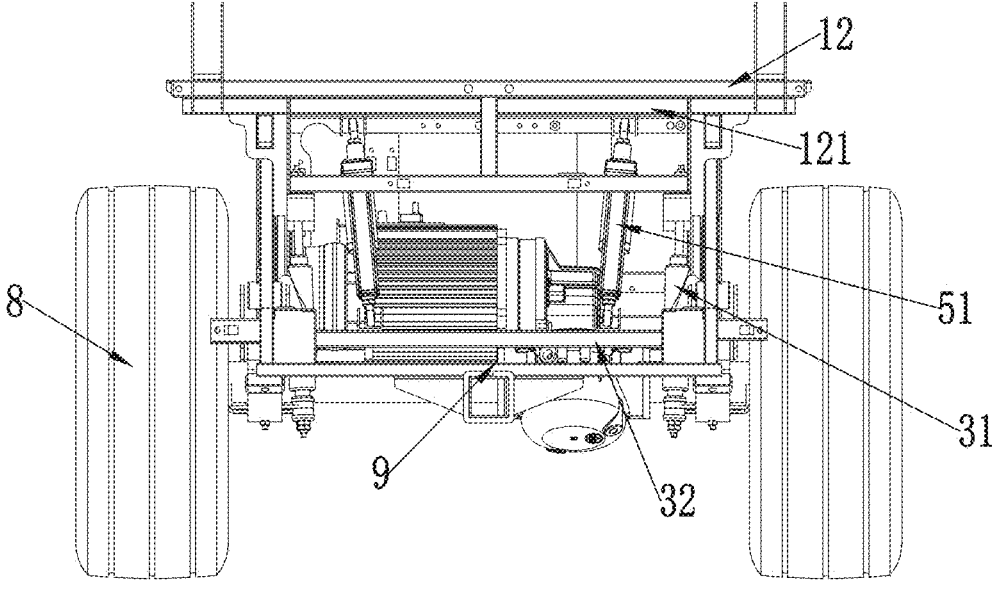
FIG. 4 is an assembly schematic diagram of a rear subframe, a movable rear suspension, and one or more rear lifting devices in the preferred embodiment of the present disclosure.

As shown in FIG. 4, the movable rear suspension 3 comprises two shock absorbers 31, and the two shock absorbers 31 are respectively connected to a motor drive mechanism 9 connected to two rear wheels 8. The one or more rear lifting devices 5 are two rear lifting devices 5, and the two rear lifting devices 5 respectively correspond to the two shock absorbers 31. A combination of two the shock absorbers 31 and the motor drive mechanism 9 enables independent control of the movable rear suspension 3, improving vehicle handling and stability while optimizing a driving performance of the two rear wheels 8.

Figure 8:
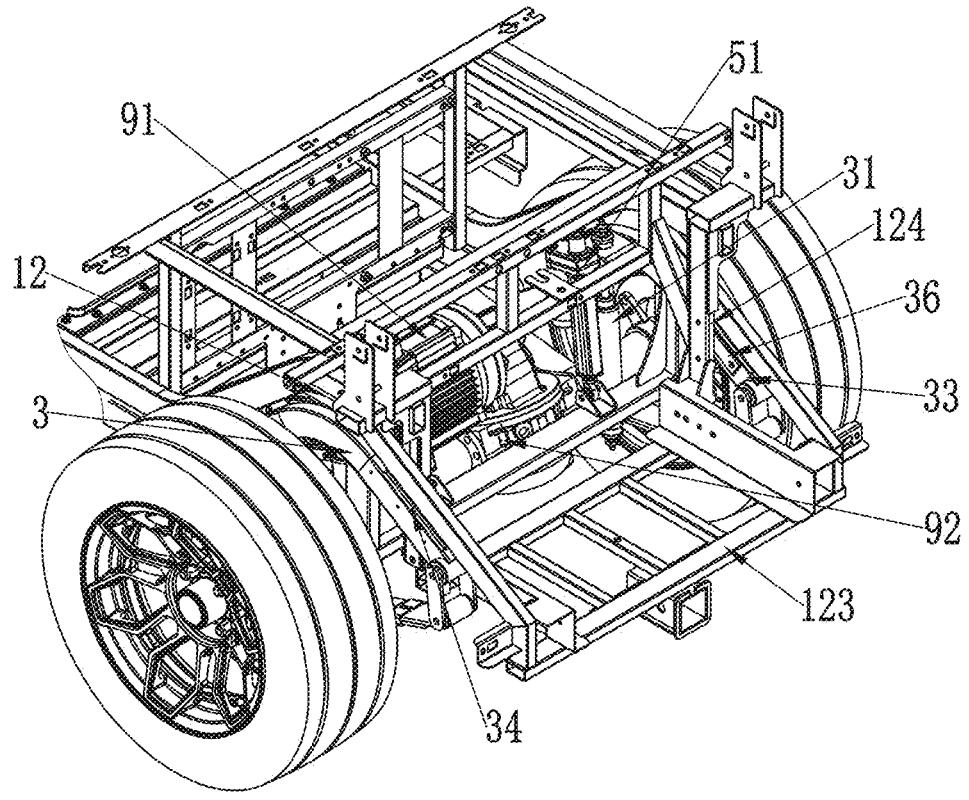
FIG. 8 is an assembly schematic diagram of the rear subframe and the movable rear suspension in the preferred embodiment of the present disclosure.

As shown in FIG. 8, the motor drive mechanism 9 comprises a direct current (DC) motor 91 configured as a power source of an entire vehicle, and a rear axle 92 is driven by the DC motor 91 to form the power source. The rear axle 92 is configured as a power source converter of the entire vehicle. The two rear wheels 8 are driven by cooperation of the DC motor 91 and the rear axle 92. The movable front suspension 2 is connected to the two front wheels 6, and the two front wheels 6 are passive wheels. As an existing technology, the motor drive mechanism 9 is widely used in small pure electric vehicles, such as golf carts, sightseeing tour buses, shared electric vehicles, passenger electric vehicles, etc.

As shown in FIG. 4, the one or more rear lifting devices 5 are assembled as follows. The movable rear suspension 3 comprises a lower mounting transverse rod 32, and the rear subframe 12 comprises an upper mounting transverse rod 121. Each of the one or more rear lifting devices 5 comprises a rear electric push rod 51. Two ends of the rear electric push rod 51 are respectively pivotally connected to the upper mounting transverse rod 121 and the lower mounting transverse rod 32. One end of the rear electric push rod 51 that is pivotally connected to the upper mounting transverse rod 121 serves as a lifting end. The rear electric push rod 51 serves as a power source for a lifting function of the movable rear suspension 3. Through the rear electric push rod 51, a lifting function of the rear subframe 12 is realized, working in conjunction with the two front lifting devices 4 to further optimize passability and maneuverability of the vehicle.

As shown in FIGS. 5-6, the rear subframe 12 covers an upper portion of the movable rear suspension 3. Two sides of the rear subframe 12 are disposed with two first supporting rods 122 in a width direction of the rear subframe 12, and two sides of the movable rear suspension 3 are disposed with two second supporting rods 33 in the width direction of the rear subframe 12. The two first supporting rods 122 are disposed above the two second supporting rods 33, and a rubber impact protection pad 34 is disposed on an upper surface of the two second supporting rods 33. When the rear subframe 12 is lifted down to a lowest position, the rubber impact protection pad 34 contacts the first supporting rod 122. The rubber impact protection pad 34 effectively cushions collisions between the rear subframe 12 and the movable rear suspension 3, protecting the vehicle components and improving vehicle safety and durability.

As shown in FIG. 8, the rear subframe 12 comprises a storage rack 123 for mounting a storage basket for conveniently placing items. The storage rack 123 is disposed between the two second supporting rods 33 on the two sides of the movable rear suspension 3 in the width direction of the rear subframe 12. A nylon pad 36 is disposed on a side of each of the two second supporting rods 33 facing the storage rack 123. Two sides of the storage rack 123 are disposed with two third supporting rods 124 in the width direction of the rear subframe 12. The nylon pad 36 frictionally cooperates with the two third supporting rods 124, utilizing a wear-resistant property of the nylon pads 36 to ensure left-right stability during raising and lowering of the rear subframe 12.

In this embodiment, the lifting chassis structure of the small pure electric vehicle achieves flexible adjustment of a chassis height through independent control of the two front lifting devices 4 and the one or more rear lifting devices 5. The front subframe 11 and the rear subframe 12 are respectively driven by the two front lifting devices 4 and the one or more rear lifting devices 5 to achieve up and down lifting functions. The movable front suspension 2 and the movable rear suspension 3 are respectively equipped with the two shock absorber assemblies 21 and the two shock absorbers 31 to optimize vibration reduction and handling performance of the vehicle. The impact protection assembly and the rubber impact protection pad 34 further improve the safety and durability of the vehicle. This structure is suitable for a variety of small pure electric vehicles and has significant market application value.

The above is only a preferred specific implementation method of the present disclosure, but the design concept of the present disclosure is not limited to this. Any technician familiar with the technical field who uses this concept to make non-substantial changes to the present disclosure within the technical scope disclosed by the present disclosure shall be deemed to infringe the protection scope of the present disclosure.

What is claimed is:

1. A lifting chassis structure for a pure electric vehicle, comprising:

a chassis body, a movable front suspension, a movable rear suspension, a first front lifting device, a second front lifting device, and a first rear lifting device, wherein:

the chassis body comprises a front subframe and a rear subframe, the first front lifting devices and the second front lifting device are connected to the movable front suspension and the front subframe, the first rear lifting devices is connected to the movable rear suspension and the rear subframe, the front subframe and the rear subframe are configured to be respectively driven by the first front lifting device and the first rear lifting device, so as to be lifted up and down respectively relative to the movable front suspension and the movable rear suspension, so that the chassis body is lifted up and down in a height direction, movements of the first front lifting device and the second front lifting device are synchronous, the movable front suspension comprises a shock absorber assembly and a steering assembly, the shock absorber assembly is connected to the steering assembly, the first front lifting device and the second front lifting device are arranged in a splayed pattern, the first front lifting device corresponds to the shock absorber assembly, the first front lifting device is parallel to the shock absorber assembly, the front subframe comprises a space for placing the movable front suspension, the movable front suspension comprises a first mounting frame configured to be connected to the steering assembly and a second mounting frame configured to be connected to the first front lifting device and the second front lifting device, the first mounting frame is connected to the second mounting frame, the front subframe comprises an impact protection assembly, when the front subframe is lifted up or down, the impact protection assembly cooperates with the first mounting frame, the first front lifting device comprises a front electric push rod, the front subframe comprises an upper mounting seat, the second mounting frame comprises a lower mounting seat and a shock absorber mounting seat, two ends of the front electric push rod are respectively pivotally connected to the upper mounting seat and the lower mounting seat, one end of the front electric push rod that is pivotally connected to the upper mounting seat is a lifting end, two ends of the shock absorber assembly are respectively pivotally connected to the shock absorber mounting seat and the steering assembly, and the shock absorber mounting seat is arranged adjacent to the upper mounting seat in the height direction.

2. The lifting chassis structure for the pure electric vehicle according to claim 1, wherein:

the impact protection assembly comprises an upper bumper and a lower bumper, which are spaced apart in the height direction, when the front subframe is lifted up to a highest position, the lower bumper contacts a bottom of the first mounting frame, and when the front subframe is lifted down to a lowest position, the upper bumper contacts a top of the first mounting frame.

3. A pure electric vehicle, comprising:

the lifting chassis structure for the pure electric vehicle according to claim 2, wherein:

the pure electric vehicle is a golf cart, a sightseeing tour bus, a shared electric vehicle, or a passenger electric vehicle.

4. The lifting chassis structure for the pure electric vehicle according to claim 2, wherein:

the upper bumper and the lower bumper are rubber pads.

5. A pure electric vehicle, comprising:

the lifting chassis structure for the pure electric vehicle according to claim 4, wherein:

the pure electric vehicle is a golf cart, a sightseeing tour bus, a shared electric vehicle, or a passenger electric vehicle.

6. The lifting chassis structure for the pure electric vehicle according to claim 1, wherein:

the movable rear suspension comprises a first shock absorber and a second shock absorber, the first shock absorber is connected to a first motor drive mechanism connected to a first rear wheel, the second shock absorber is connected to a second motor drive mechanism connected to a second rear wheel, the lifting chassis structure comprises a second rear lifting device, the first rear lifting device corresponds to the first shock absorber, and the second rear lifting device corresponds to the second shock absorber.

7. A pure electric vehicle, comprising:

the lifting chassis structure for the pure electric vehicle according to claim 6, wherein:

the pure electric vehicle is a golf cart, a sightseeing tour bus, a shared electric vehicle, or a passenger electric vehicle.

8. The lifting chassis structure for the pure electric vehicle according to claim 6, wherein:

the movable rear suspension comprises a lower mounting transverse rod, the rear subframe comprises an upper mounting transverse rod, each of the first rear lifting device and the second rear lifting device comprises a rear electric push rod, a first end of the rear electric push rod of the first rear lifting device is a lifting end and is pivotally connected to the upper mounting transverse rod, a first end of the rear electric push rod of the second rear lifting device is a lifting end and is pivotally connected to the upper mounting transverse rod, a second end of the rear electric push rod of the first rear lifting device is pivotally connected to the lower mounting transverse rod, and a second end of the rear electric push rod of the second rear lifting device is pivotally connected to the lower mounting transverse rod.

9. A pure electric vehicle, comprising:

the lifting chassis structure for the pure electric vehicle according to claim 8, wherein:

the pure electric vehicle is a golf cart, a sightseeing tour bus, a shared electric vehicle, or a passenger electric vehicle.

10. The lifting chassis structure for the pure electric vehicle according to claim 1, wherein:

the rear subframe covers an upper portion of the movable rear suspension, a first side of the rear subframe in a width direction of the rear subframe is disposed with a first supporting rod, a second side of the rear subframe in the width direction of the rear subframe is disposed with a second supporting rod, a first side of the movable rear suspension in the width direction of the rear subframe is disposed with a third supporting rod, a second side of the movable rear suspension in the width direction of the rear subframe is disposed with a fourth supporting rod, the first supporting rods is disposed above the third supporting rod, the second supporting rod is disposed above the fourth supporting rod, a first rubber impact protection pad is disposed on an upper surface of the third supporting rod, a second rubber impact protection pad is disposed on an upper surface of the fourth supporting rod, and when the rear subframe is lifted down to a lowest position, the first rubber impact protection pad contacts the first supporting rod and the second rubber impact protection pad contacts the second supporting rod.

11. A pure electric vehicle, comprising:

the lifting chassis structure for the pure electric vehicle according to claim 10, wherein:

the pure electric vehicle is a golf cart, a sightseeing tour bus, a shared electric vehicle, or a passenger electric vehicle.

12. The lifting chassis structure for the pure electric vehicle according to claim 10, wherein:

the rear subframe comprises a storage rack, the storage rack is disposed between the third supporting rod and the fourth second supporting rod in the width direction of the rear subframe, a first nylon pad is disposed on a side of the third second supporting rod facing the storage rack, a second nylon pad is disposed on a side of the fourth supporting rod facing the storage rack, a first side of the storage rack in the width direction of the rear subframe is disposed with a fifth supporting rod, a second side of the storage rack in the width direction of the rear subframe is disposed with a sixth supporting rod, the first nylon pad frictionally cooperates with the fifth supporting rod, and the second nylon pad frictionally cooperates with the sixth supporting rod.

13. A pure electric vehicle, comprising:

the lifting chassis structure for the pure electric vehicle according to claim 12, wherein:

the pure electric vehicle is a golf cart, a sightseeing tour bus, a shared electric vehicle, or a passenger electric vehicle.

14. A pure electric vehicle, comprising:

the lifting chassis structure for the pure electric vehicle according to claim 1, wherein:

the pure electric vehicle is a golf cart, a sightseeing tour bus, a shared electric vehicle, or a passenger electric vehicle.

15. A lifting chassis structure for a pure electric vehicle, comprising:

a chassis body, a movable front suspension, a movable rear suspension, a first front lifting device, a second front lifting device, and a rear lifting device, wherein:

the chassis body comprises a front subframe and a rear subframe, the first front lifting device and the second front lifting device are connected to the movable front suspension and the front subframe, the rear lifting device is connected to the movable rear suspension and the rear subframe, the front subframe and the rear subframe are configured to be respectively driven by the first front lifting device and the rear lifting device, so as to be lifted up and down respectively relative to the movable front suspension and the movable rear suspension, so that the chassis body is lifted up and down in a height direction, movements of the first front lifting device and the second front lifting device are synchronous, the movable front suspension comprises a shock absorber assembly and a steering assembly, the shock absorber assembly is connected to the steering assembly, the first front lifting device and the second front lifting device are arranged in a splayed pattern, the first front lifting device corresponds to the shock absorber assembly, the first front lifting device is parallel to the shock absorber assembly, the movable rear suspension comprises a first shock absorber and a second shock absorber, the first shock absorber is connected to a first motor drive mechanism connected to a first rear wheel, the second shock absorber is connected to a second motor drive mechanism connected to a second rear wheel, the rear lifting device comprises a first rear lifting device and a second rear lifting device, the first rear lifting device corresponds to the first shock absorber, the second rear lifting device corresponds to the second shock absorber, the movable rear suspension comprises a lower mounting transverse rod, the rear subframe comprises an upper mounting transverse rod, the first rear lifting device comprises a rear electric push rod, a first end of the rear electric push rod of the first rear lifting device is a lifting end and is pivotally connected to the upper mounting transverse rod, and a second end of the rear electric push rod of the first rear lifting device is pivotally connected to the lower mounting transverse rod.

16. A lifting chassis structure for a pure electric vehicle, comprising:

a chassis body, a movable front suspension, a movable rear suspension, a first front lifting device, a second front lifting device, and a rear lifting device, wherein:

the chassis body comprises a front subframe and a rear subframe, the first front lifting device and the second front lifting device are connected to the movable front suspension and the front subframe, the rear lifting device is connected to the movable rear suspension and the rear subframe, the front subframe and the rear subframe are configured to be respectively driven by the first front lifting device and the rear lifting device, so as to be lifted up and down respectively relative to the movable front suspension and the movable rear suspension, so that the chassis body is lifted up and down in a height direction, movements of the first front lifting device and the second front lifting device are synchronous, the movable front suspension comprises a shock absorber assembly and a steering assembly, the shock absorber assembly is connected to the steering assembly, the first front lifting device and the second front lifting device are arranged in a splayed pattern, the first front lifting device corresponds to the shock absorber assembly, the first front lifting device is parallel to the shock absorber assembly, the front subframe comprises a space for placing the movable front suspension, the movable front suspension comprises a first mounting frame configured to be connected to the steering assembly and a second mounting frame configured to be connected to the first front lifting device and the second front lifting device, the first mounting frame is connected to the second mounting frame, the front subframe comprises an impact protection assembly, the impact protection assembly comprises an upper
   bumper and a lower bumper, which are spaced apart
   in the height direction,
when the front subframe is lifted up or down, the
   impact protection assembly cooperates with the first 5
   mounting frame,
when the front subframe is lifted up to a highest
   position, the lower bumper contacts a bottom of the
   first mounting frame, and
when the front subframe is lifted down to a lowest 10
   position, the upper bumper contacts a top of the first
   mounting frame.

\* \* \* \* \*